United States Patent [19]

McIntyre et al.

[11] Patent Number: 5,749,006
[45] Date of Patent: May 5, 1998

[54] CAMERA FOR RECORDING IMAGES ON A PHOTOGRAPHIC FILM OR ON A MAGNETIC TAPE

[75] Inventors: Dale F. McIntyre, Honeoye Falls; Loretta E. Allen, Hilton, both of N.Y.

[73] Assignee: Eastman Kodak Company, Rochester, N.Y.

[21] Appl. No.: 896,714

[22] Filed: Jul. 18, 1997

Related U.S. Application Data

[63] Continuation of Ser. No. 672,390, May 29, 1996, abandoned.

[51] Int. Cl.[6] .......................... G03B 17/24; G03B 17/48; G03B 19/06; G03B 29/00
[52] U.S. Cl. ...................... 396/310; 396/429; 396/446
[58] Field of Search ........................ 354/76, 106, 105; 396/429, 446, 319, 320, 321, 310

[56] References Cited

U.S. PATENT DOCUMENTS

| | | | |
|---|---|---|---|
| 4,122,821 | 10/1978 | Nealon | 354/76 |
| 4,684,229 | 8/1987 | Utsugi | 354/106 |
| 4,714,962 | 12/1987 | Levine | 358/209 |
| 4,742,369 | 5/1988 | Ishii et al. | 354/441 |
| 4,949,117 | 8/1990 | Van Heyningen et al. | 354/412 |
| 4,983,996 | 1/1991 | Kinoshita | 354/76 |
| 5,028,940 | 7/1991 | Pearson | 354/75 |
| 5,050,017 | 9/1991 | Carr et al. | 360/77 |
| 5,389,984 | 2/1995 | Lovenheim | 354/76 |
| 5,489,955 | 2/1996 | Satoh et al. | 354/76 |
| 5,519,464 | 5/1996 | Brock et al. | 354/106 |
| 5,521,663 | 5/1996 | Norris, III | 354/106 |
| 5,555,252 | 9/1996 | Brock et al. | 354/106 |
| 5,606,420 | 2/1997 | Maeda et al. | 358/296 |

*Primary Examiner*—Safet Metjahic
*Assistant Examiner*—Christopher E. Mahoney
*Attorney, Agent, or Firm*—Raymond L. Owens

[57] ABSTRACT

A camera for recording images on a photographic film in a cartridge and for recording images on a magnetic tape in a cartridge is disclosed. The camera includes a storage section for receiving a cartridge which can contain either photographic film or magnetic tape and a first optical path for recording an image of a subject on the photographic film when a photographic film cartridge is disposed in the storage section. The camera further includes an area image sensor for receiving an image of the subject and storing the image as a plurality of electrical signals and a recorder responsive to a cartridge containing magnetic tape being disposed in the cartridge receiver, for selectively recording images from the storage section onto a magnetic tape.

14 Claims, 5 Drawing Sheets

CAMERA FOR RECORDING IMAGES ON A PHOTOGRAPHIC FILM OR ON A MAGNETIC TAPE

This is a continuation of application Ser. No. 08/672,390, filed May 29, 1996, now abandoned.

CROSS REFERENCE TO RELATED APPLICATIONS

The present invention is related to U.S. Provisional Patent application No. 60/004,555, filed Sep. 29, 1995, entitled "A Non-Photographic Strip Having a Base Layer Similar to a Photographic Filmstrip and a Magnetic Recording Layer", assigned to the assignee of the present invention. The disclosure of this related application is incorporated herein by reference.

FIELD OF THE INVENTION

The present invention relates to cameras which can record images on photographic film and images on electronic storage media.

BACKGROUND OF THE INVENTION

It has been recognized as a need for an image capture apparatus or system to substantially simultaneously capture both silver halide and electronic images. There are many variations on this theme. Generally, these cameras include conventional optics and film handling mechanisms for forming an image on film, and they also include a solid state imager and a display for forming and viewing an image. Such a camera can be used in a preview mode whereby a photographer can view an electronically recorded scene on the display without having to expose the film. The preview mode makes it convenient to arrange the composition and verify the exposure level before a permanent image is captured on film. The camera can also be operated in the review mode in which a photographer can view an image on the display which has also been captured on film. In this manner, important scenes like weddings and once in a lifetime vacations are verified as properly captured before leaving the scene.

One such camera is described in U.S. Pat. No. 4,742,369 to Iishi et. al. wherein an electronic still camera is disclosed that is adapted to form an image on a photosensitive film. The claims include a storage means that could be a floppy disk.

Again in U.S. Pat. No. 4,949,117 to Van Heyningen et al. a camera is described that has an electronic imager and display in addition to standard film capture. The electronic imager is used to control the parameters of image capture on film in addition to being directly responsible for the image of the electronic display.

In U.S. Pat. No. 5,389,984 to Lovenheim, a hybrid camera is described where by a film image and a video image are simultaneously captured by sending capture signals in a controlled sense such that given known acquisition parameters dictate a simultaneous capture. The camera is additionally operatively attached to a computer for controlling said signals. In this case, the user has a severe constraint of being tied to a computer to control the camera.

In U.S. Pat. No. 4,714,962 to Levine, a dual electronic camera is shown that substantially concurrently captures electronic and silver halide images. The electronic image is used to preview or review images captured on silver halide. A recorder means is provided for recording instructions concerning the processing each of the frames. This recorder means might be the optical properties of the film or a separate memory or recorder.

The operation of the linear magnetic head array 36 is well understood in the camera art and reference is made to commonly assigned U.S. Pat. No. 5,050,017 issued Sep. 17, 1991 to Carr et al, the disclosure of which is incorporated herein by reference.

In all of these cameras found in the prior art, the electronic image is used for preview or review and typically not stored or downloaded as an alternative to the film image. When the image is electronically stored, typically a solid state memory or a floppy disk is used. The cameras can't accept alternate media in place of the film to record the electronic image within the same mechanism used to hold move the film. It is therefore still a problem to record both photographic and electronic images in hybrid cameras.

SUMMARY OF THE INVENTION

It is an object of the present invention to provide a hybrid camera which can effectively store images on photographic film and on magnetic tape.

This object is achieved in a camera for recording images on a photographic film in a cartridge and for recording images on a magnetic tape in a cartridge, the improvement comprising:

a) means for receiving a cartridge which can contain either photographic film or magnetic tape;

b) optical means for recording an image of a subject on the photographic film when a photographic film cartridge is disposed in the cartridge receiving means;

c) image storage means for receiving an image of the subject and storing such image as a plurality of electrical signals; and d) means responsive to a cartridge containing magnetic tape being disposed in the cartridge receiving means for selectively recording images from the image storage means onto a magnetic tape.

ADVANTAGES

It is an advantage of the present invention that magnetic tape can be used to store electronic images in a cost effective manner, in a camera that can also expose images on photographic film.

It is a further advantage of the invention that a single storage section of a camera can be used for receiving cartridges that selectively can have photographic film or magnetic tape.

A still further advantage is that the camera can automatically determine if a film cartridge or magnetic cartridge has been inserted into the cartridge receiving section. Moreover, a number of different features can be actuated by the insertion of a cartridge containing magnetic tape.

It is another advantage of the invention that sufficient digital memory can be provided to store the electronic images of several (n) film images which can be written to the magnetic tape once a magnetic tape cartridge is loaded thus permitting a reviewed silver halide image to be selectively and electronically stored outside of the camera.

Furthermore, another object of the invention is that a user can add additional digital memory via plug-in module, cable-tethered external device or the like to buffer additional simultaneously captured electronic pictures that are being recorded on the silver halide film which is physically loaded into the camera.

3

A still further advantage is to provide a hybrid camera which can operate as an electronic camera which transfers electronic images to memory and then selectively either transfer such images to a magnetic tape or images from a magnetic tape into the memory.

DETAILED DESCRIPTION OF THE INVENTION

Figure 1:
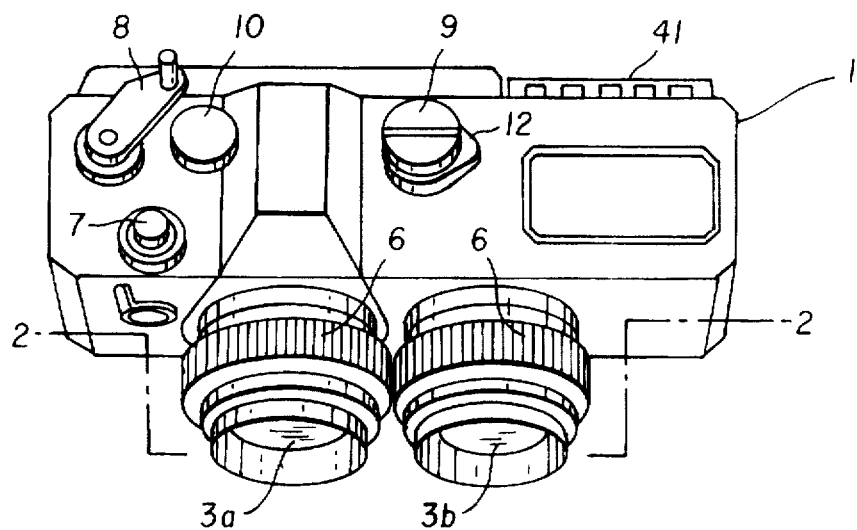
FIG. 1 is a perspective view of a hybrid dual lens camera in accordance with the present invention.

Turning now to FIG. 1, there is shown a hybrid dual lens camera having a hybrid camera main body 1; imaging lenses 3a and 3b; manually focusing mechanisms 6; a shutter switch including a self-return push-button switch 7; a wind-up lever 8; a shutter speed dial 9; a film rewind knob 10; and a film sensitivity dial 12. These components are the same as those in a normal camera.

Figure 2:
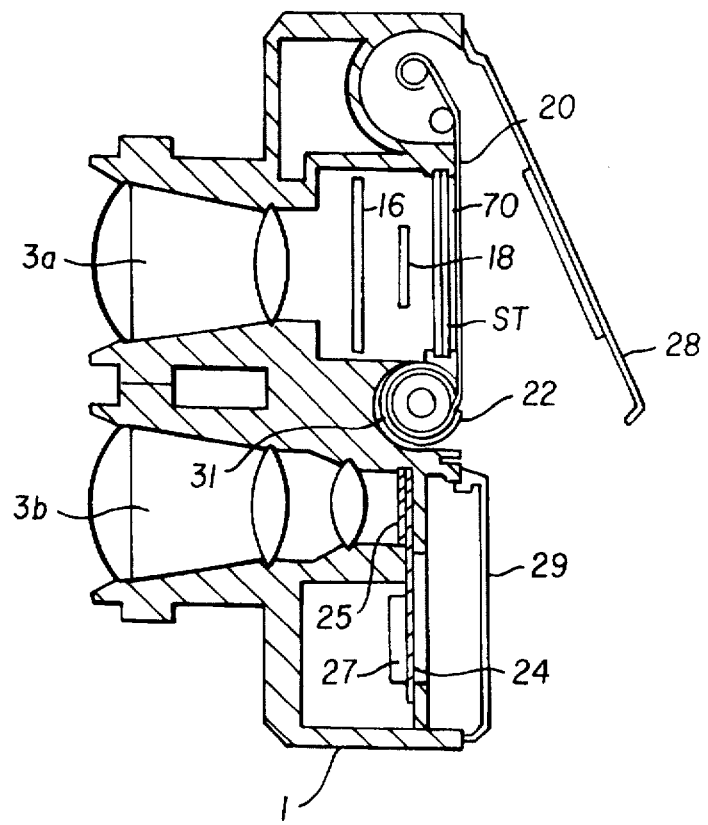
FIG. 2 is a cross sectional view of the camera shown in FIG. 1 taken along the lines 2—2.
Figure 5:
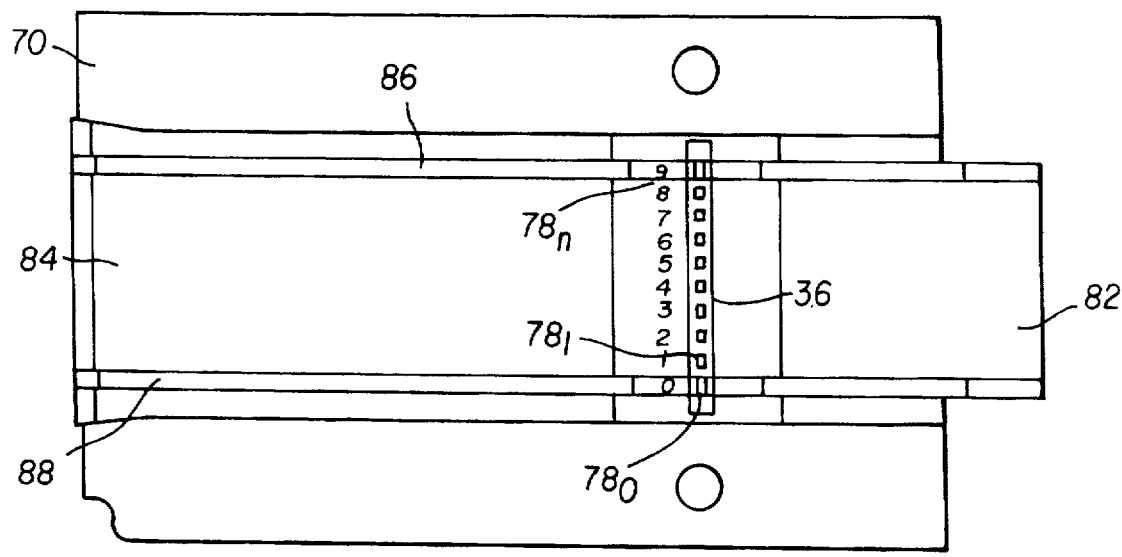
FIG. 5 is a top view of the relative positioning of a multitrack linear head with respect to the camera film rail and gate frame.
Figure 6:
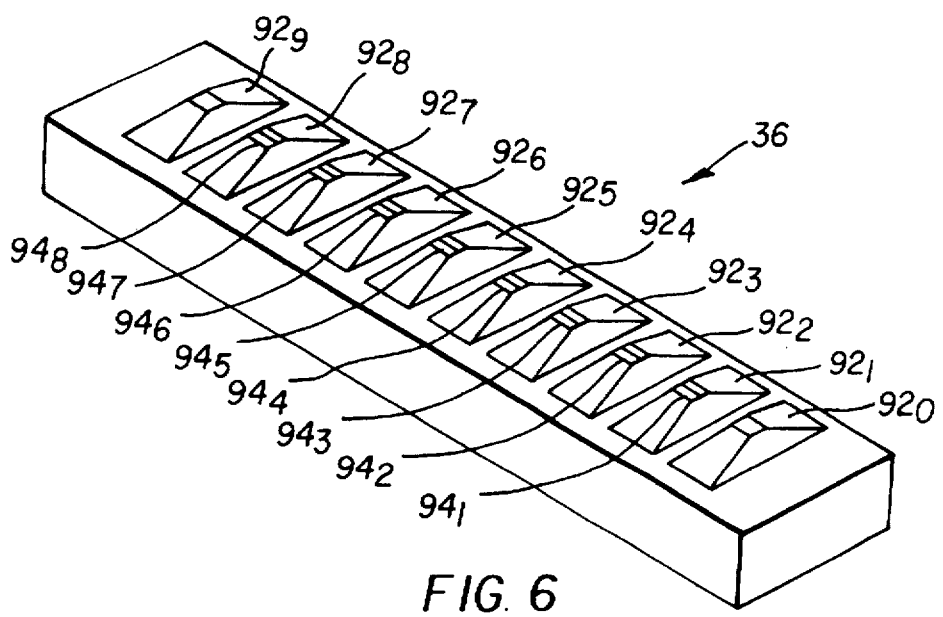
FIG. 6 is a perspective schematic view of the frustrums of one embodiment of a multihead array formed in accordance with the invention.

Turning now to FIG. 2 which is a cross sectional view which depicts the hybrid camera which includes a TTL automatic exposure function (not shown), and has a normal structure including a reflex mirror 16, submirror 18, shutter curtain ST, film 20 disposed in a cartridge 22. The cartridge 22 is removable from the camera body and a new cartridge 22, having substantially the same design as the film cartridge, can be inserted into the camera body. This new cartridge includes a magnetic tape. When this happens, a linear magnetic head array 36 is activated. This linear magnetic head array 36 is shown in FIGS. 5 and 6 and will be discussed later.

As is well known in the art, the substrate of the film 20 can have on its rear side, coated a transparent magnetic layer. Another magnetic head 38, which is under the control of head interface electronics 40 (see FIGS. 4a and 4b), can be used to read and write information to the transparent magnetic storage layer. The head interface electronics 40 provides signals to either the linear magnetic head array 36 or magnetic head 38 in a conventional manner. Although two separate arrangements will be described for the linear magnetic head array 36 and the magnetic head 38, those skilled in the art will appreciate that a single magnetic head unit can be used to provide the functions of these heads. Magnetic head 38 typically includes two tracks which correspond to tracks C1 and C2 on the film 20. This arrangement will be discussed later in connection with FIG. 4b. For a more complete disclosure see, for example, commonly assigned U.S. Pat. No. 5,130,745 issued Jul. 14, 1992 to Cloutier et al, entitled "Film Information Exchange System Using Dedicated Magnetic Tracks on Film", the disclosure of which is incorporated by reference.

The hybrid camera includes an image sensor 25 arranged to coincide with the axis of the imaging lens 3b, and is electrically connected to a semiconductor chip 27 mounted on a printed circuit board 26. In this embodiment, respective rear covers 28 and 29 for the film and electronic portion of the hybrid camera are independently provided. As is well understood, a cartridge receiving structure 31 is provided within the hybrid camera body 1 and, in accordance with the present invention, can receive a cartridge which has either photographic film or magnetic tape.

Figure 3:
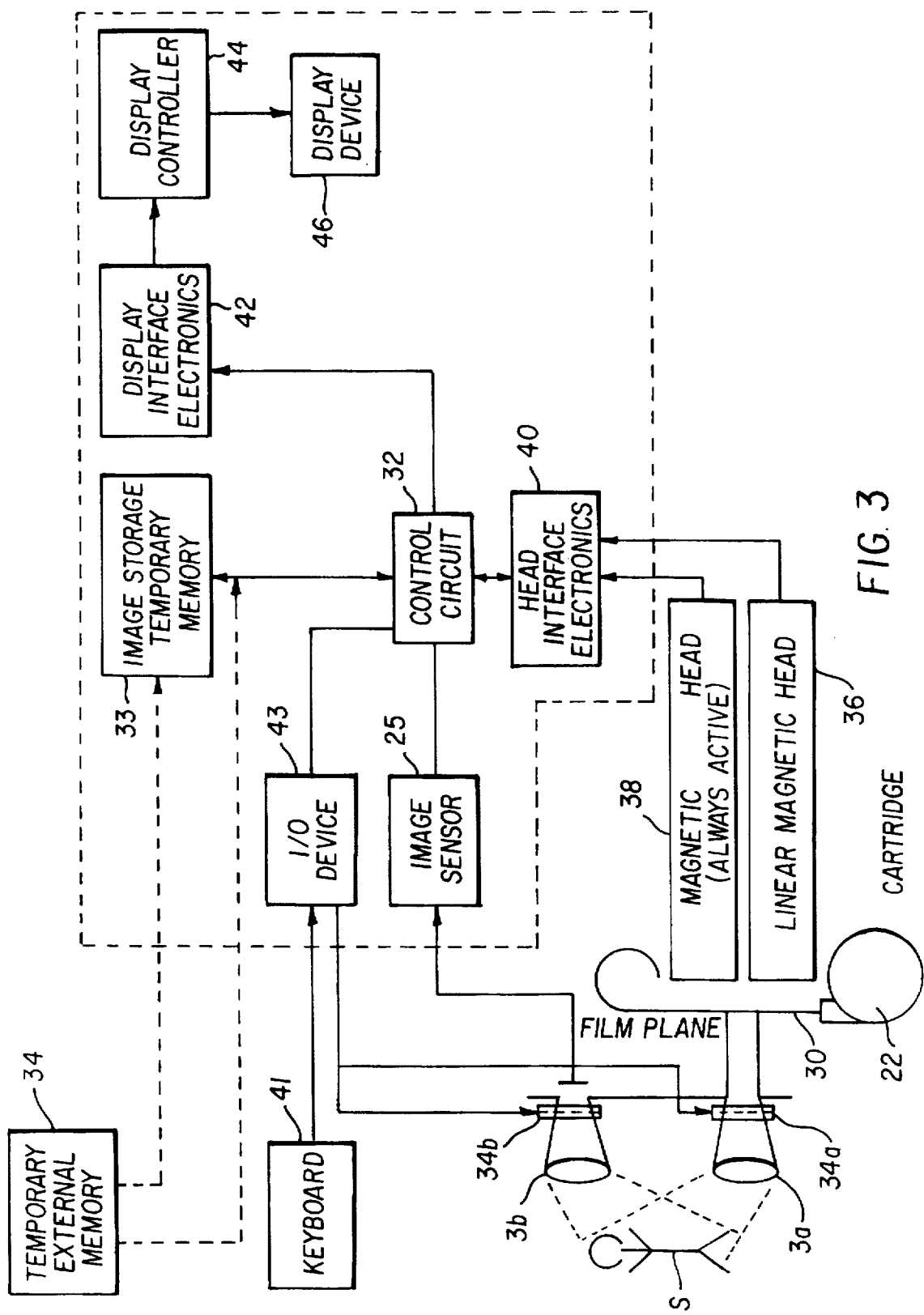
FIG. 3 is a block diagram of various elements of the hybrid camera system shown in FIG. 1.

In FIG. 3, a block diagram is shown of various systems within the hybrid camera 1. As shown, a subject S is positioned in front of the camera lenses 3a and 3b. An image of the subject is focused on a film plane 30 by the camera lens 3a of the cartridge 22 which contains photographic film or magnetic tape. An image of the subject S is also focused by the camera lens 3b and other optical elements (not shown) upon the image sensor 25. Image sensor 25 can be a full frame charge coupled device (CCD) or, alternatively, can be an interline device with, for example, photodiode pixels which are adapted to deliver charge to interline CCDs. Conventional electronic circuitry (not shown) is associated with the image sensor 25. After the image sensor receives light representative of the image of the subject S, the circuitry sets up, acquires, and transfers electronic signals from the image sensor to circuitry for image processing. Such electronics are well known in the art and their description omitted for clarity of discussion. A control circuit 32 is adapted to transfer images from a temporary storage memory 33 to display interface electronics 42. The display interface electronics 42 causes digital images to be delivered to a display controller 44 which, in turn, causes selected images to be shown on a display device 46, such as a liquid crystal display device 46. When the image storage temporary memory 33 is fully loaded, the control circuit 32 signals to the display interface electronics 42 an appropriate signal causing the display controller 44 to display information on the display device 46 indicating to the user that the image storage temporary memory 33 is full. The user then, via the keyboard 41, makes a decision whether to transfer the images in the display interface electronics 42 or to rewind the film cartridge 22 and insert a cartridge 22 containing magnetic tape. The arrangement of such type of a display structure is well known in the art and used on many commercially available cameras such as the Casio QV-10 digital still camera. The control circuit 32 controls an image storage temporary memory 33. In operation, shutter mechanisms 34a and 34b (shown schematically as dotted lines) of the hybrid camera are simultaneously operated and images of the subject S are directed to the photographic film plane 30 for recording on the photographic film and onto the image sensor 25. The operation of the shutters is as best shown in FIG. 3 under the control of an input/output device 43 such that when a magnetic cartridge is loaded into the camera, the shutter 34a is disabled and prevents light from the subject from illuminating the photographic film plane 30. This is actually accomplished by the linear magnetic head array 36 detecting the presence of a prerecorded signal on the magnetic tape. The image storage temporary memory 33 may include transistors that can store a number of images as is well known to those skilled in the art. Each time an image is to be photographed on the film, a corresponding image is stored in image storage temporary memory 33. Another temporary external memory 34 is shown which is external to the camera itself and can either receive or deliver signals directly under the control of the control circuit 32.

The linear magnetic head array 36 is under the control of the head interface electronics 40. In accordance with the present invention, after a cartridge 22 having a magnetic tape is inserted into the camera, the magnetic head 38 detects the presence of a cartridge 22 having magnetic tape and provides a signal to the head interface electronics 40 that a magnetic tape is now in the camera. Under the control of a user, the keyboard 41 mounted on the camera body as shown in FIG. 1 sends signals through input/output device 43 into control circuit 32 which causes data representing images to be selectively transferred to the head electronics 40 which, in turn, controls the writing of such image data via the linear magnetic head array 36. The keyboard 41 can also be mounted external to the camera.

More particularly, the keyboard 41 signals the control unit 32 to transfer selected images from the temporary storage memory 33 through the control unit 32 and the head interface electronics 40 to the linear magnetic head array 36. The linear magnetic head array 36 records such images onto magnetic tape.

Figure 4A:
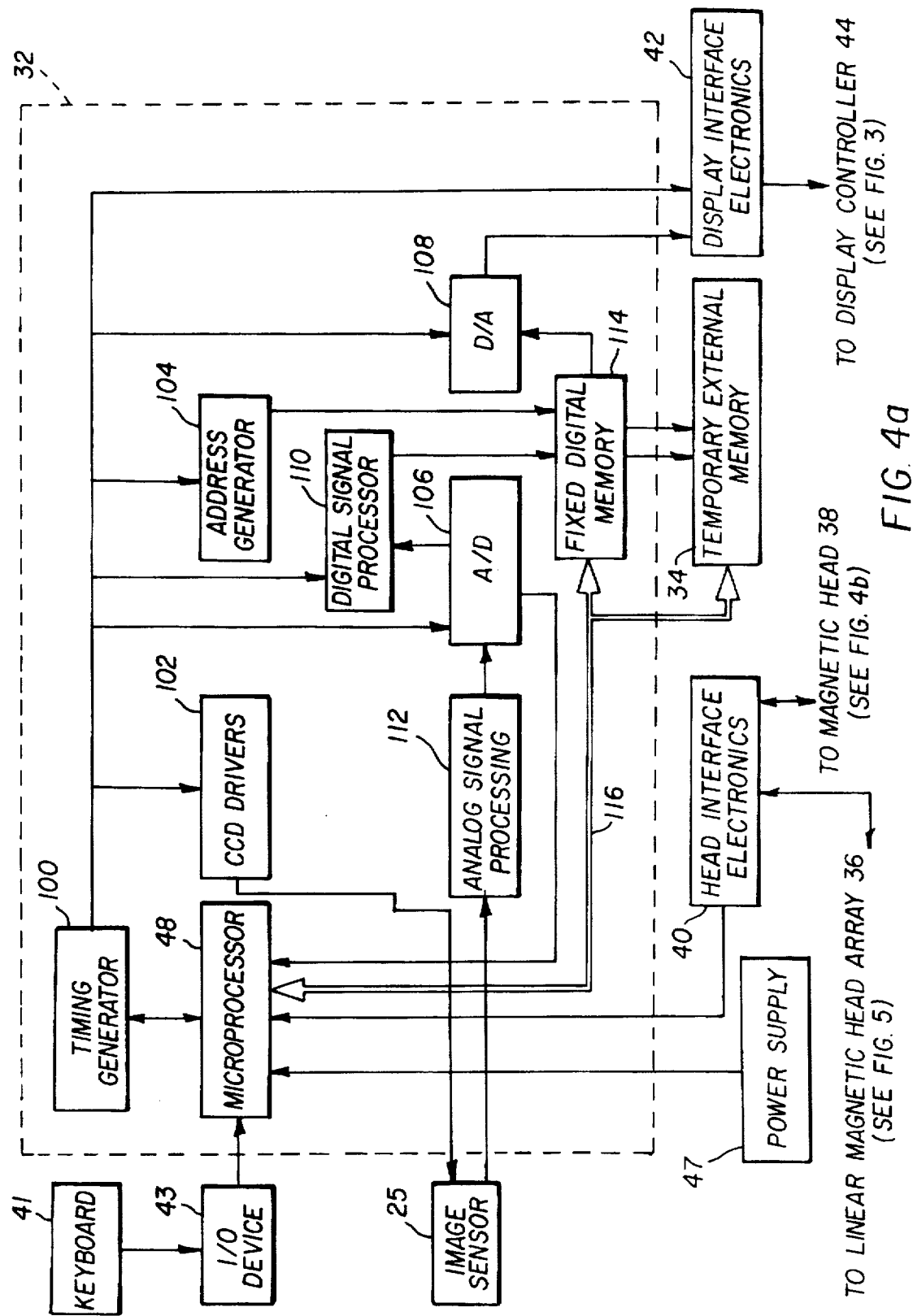
FIG. 4A and FIG. 4B perspectively shown block diagrams of the control circuit 32 and the head interface electrodes 40.

Turning now to FIG. 4a, where a more detailed block diagram is shown of control circuit 32. The control circuit 32 is shown to receive inputs from input/output device 43, which is under the control of keyboard 41. Also shown external to the control circuit 32 are the head interface electronics 40, temporary external memory 34, and display interface electronics 42, all previously discussed with reference to FIG. 3. Moreover, a power supply 47 is shown to provide power to a microprocessor 48. The microprocessor 48 receives an input from the input/output device 43 and provides control signals to a conventional timing generator 100. The timing generator 100 controls CCD drivers 102, an address generator 104, signal processing circuitry I 10, and also provides signals to an analog-to-digital converter 106 and to display interface electronics 42, as well as to a digital-to-analog converter 108. The CCD drivers, of course, control the image sensor 25 which, in turn, provides analog signals to analog signal processing circuitry 112. The analog signal processing circuitry 112 delivers signals to the analog-to-digital converter 106 which provides timing information back to the microprocessor 48 and under the control of the timing generator 100, delivers digital signals to digital signal processing circuitry 110. The digital signal processing circuitry 110 provides an input to a fixed digital memory 114. The address generator 104 causes digital information to be delivered either to the temporary external memory 34 or to the digital-to-analog converter 108. The digital-to-analog converter 108, under the control of the timing generator 100, provides input signals to the display interface electronics 42. In response to signals from timing generator 100, the display interface electronics 42 delivers image signals to the display interface electronics 42 shown in FIG. 3.

Figure 4B:
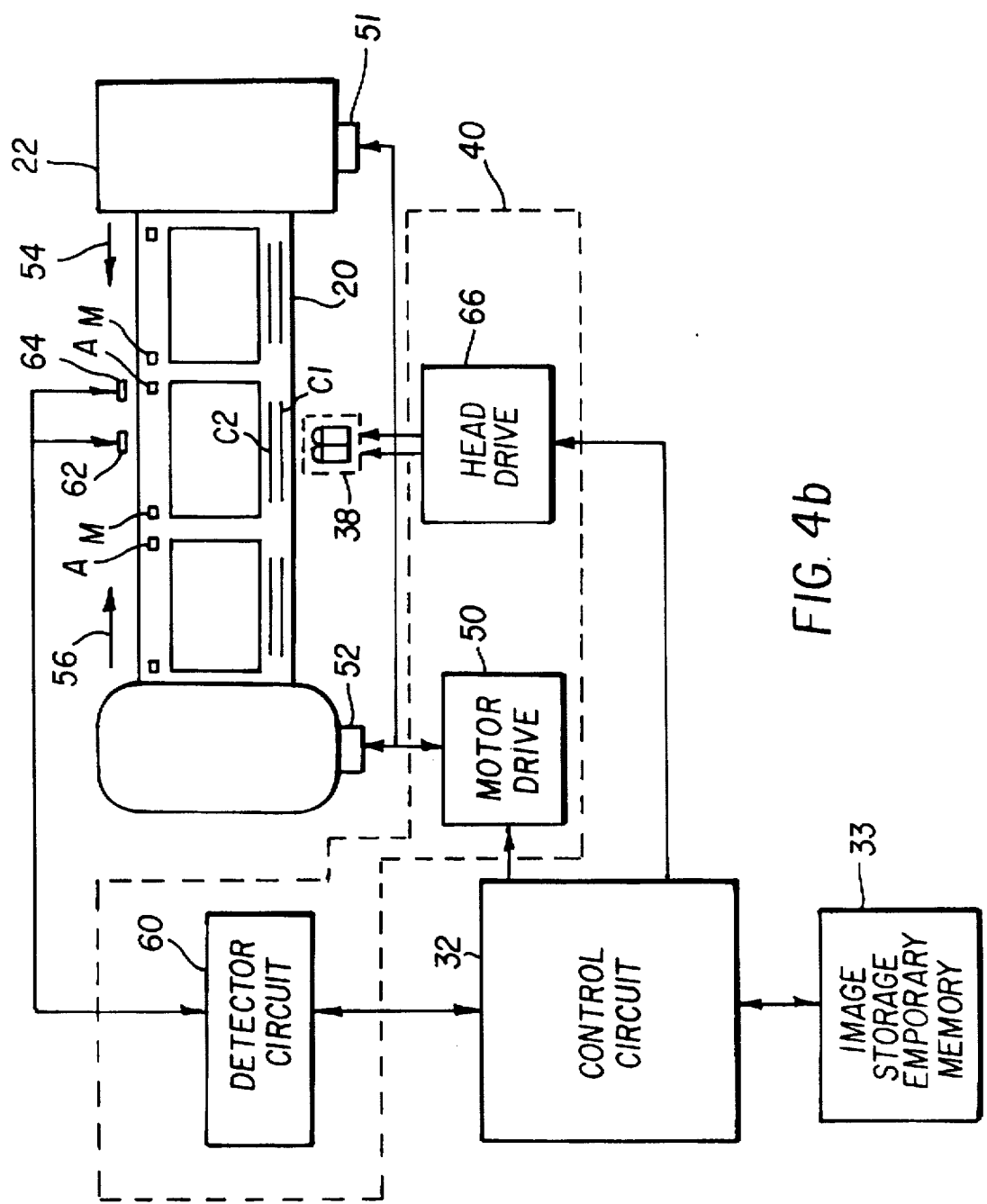

Turning now to FIG. 4b, where a more detailed block diagram shows the head interface electronics 40. In FIG. 4b, portions of the hybrid camera main body 1 associated with magnetic recording of data on film in accordance with the present invention are shown. The control circuit 32, as discussed above, controls various functions of the camera operation. Other photographic data, such as date, time, exposure information, scene orientation, and frame format can be provided in a well known manner within control circuit 32. Image storage temporary memory 33, which may be provided by an EEPROM stores image data prior to writing it to a magnetic tape. A motor drive 50 is mechanically coupled to an internal spool 51 of the cartridge 22 and to a take-up spool 52. The detail construction of the spools 51 and 52 are, of course, conventional. The motor drive 50 is operated under the control of the microprocessor 48 of control circuit 32 advances the film 20 in a first direction represented by arrow 54 from the cartridge 22 to the take-tip spool 52, frame by frame, as each image frame 55 is exposed. Once all frames are exposed, motor drive 50 is operative to rewind the film in a second direction represented by arrow 56 from the take-up spool 52 to the film cartridge 22 in one continuous motion. A detector circuit 60 is coupled between control circuit controller 32 and opto-sensors 62 and 64 to sense apertures A and M to control frame by frame advance of the film and recording data in tracks C1 and C2. In conjunction with detector circuit 60 and control circuit 32, opto-sensor 64 serves as a metering sensor responsive to detection of metering perf M to position image frame areas 65 properly within the camera exposure gate (not shown). Opto-sensor 64 serves as a velocity sensor responsive to detection of anticipation per A to sense the velocity of the film as it is being transported. Data recording in parallel longitudinal data tracks C1 and C2 is accomplished by means of magnetic head 38 driven by head drive 66 under the control of the microprocessor 48 of the control circuit controller 32. The details of film 20 and the magnetic recording layer thereon are fully described in aforementioned U.S. Pat. No. 5,130,745, the disclosure of which is incorporated herein by reference. For a more complete disclosure of the operation of magnetic head 38, see commonly assigned U.S. Pat. No. 5,450,149 issued Sep. 12, 1995 to Cocca entitled "Photographic Camera and Method for Recording Magnetic Data on Film", the disclosure which is incorporated herein by reference.

Turning now to FIG. 5 where the film rail and gate frame structure 70 located in hybrid camera main body I is shown. For a more complete discussion of such structure, see U.S. Pat. No. 5,502,528, the disclosure of which is incorporated herein by reference. A magnetic tape 72 will be understood to include a high density ferromagnetic structure such as found in conventional video or audio tape cassettes. For an example of such a structure, see commonly assigned Docket 72403 (McIntyre and Lee). As shown, there are a plurality of recording tracks $78_1, \ldots 78_n$ in which an image frame may be recorded in the tracks. The tracks are aligned with the active head gaps 94 of the linear magnetic head array 36.

With reference to FIG. 4b and FIG. 5, the leading edge of the magnetic tape 72 is thrust forward from a tape supply side 82 of cartridge 22 which includes the internal spool 51 to the take-up side 84 of cartridge 22 which includes take-up spool 52. The control of the spools is again by the driver motor 50 which, in turn, is controlled by the microprocessor 48 within the control circuit 32. As shown in FIG. 5, there are two rails 86 and 88, which are part of the film rail and gate frame structure 70. The operation of this type of structure is well known in the art and disclosed in detail in the above-referenced U.S. Pat. No. 5,502,528.

FIG. 6 shows the relative position of tracks 78 of the linear magnetic head array 36 in relation to the magnetic tape transport path. The linear magnetic head array 36 is a linear array of discrete heads in the shape of n=10 frustums $92_0-92_9$ containing eight active head gaps $94_1-94_8$. It should be noted that the tracks to be recorded on the magnetic tape are numbered $78_1-78_n$ where n is equal to 8. Although not shown, it will be understood that the linear magnetic head array 36 includes a plurality of ferrite core heads with associated coils for each one of the eight active head gaps $94_1-94_8$. It is the magnetic flux created in the air gap that causes information to be recorded on one of the data tracks. However, once information has been recorded in the magnetic tape 72, tape movement induces a change in the flux in the head gaps 94 that causes information to be exchanged as is well known in the art. Thus, it should be clear that the linear magnetic head array 36 can operate in both a record and playback mode. The linear magnetic head array 36 provides recording signals but also is adapted to receive signals in a playback mode. As shown in FIG. 4a, in the playback mode, the head interface electronics 40 delivers data to the microprocessor 48. Thereafter, the microprocessor 48 delivers data bus 116 to either the fixed digital memory 114 or to temporary external memory 34 for further processing as discussed above.

In operation, after a selected number of films have been recorded on a photographic film, an operator can operate the keyboard 41 and disable the shutters 34a and 34b and cause the motor drive 50 to rewind the exposed film into internal spool 51 of cartridge 22. Cartridge 22 can now be removed from the camera and another cartridge 22 with magnetic tape can be inserted into the camera or, alternatively, another cartridge containing photographic film can also be inserted into the cartridge receiving structure 31. In the event that an operator does not have photographic film available he, of course, can insert a cartridge 22 containing a magnetic tape into the camera and record directly onto such tape.

The invention has been described in detail with particular reference to a certain preferred embodiment thereof, but it will be understood that variations and modifications can be effected within the spirit and scope of the invention. For example, images can be directly exposed onto the image sensor 25 without any cartridge 22 being inserted into the cartridge receiving structure 31 and, in such a case, the camera would operate as a conventional electronic camera with the exception that the stored images could be transferred onto a magnetic tape of a cartridge 22 after such cartridge is inserted into the camera.

Parts List 1 hybrid camera main body
3a imaging lenses
3b imaging lenses
6 manually focusing mechanisms
7 shutter switch
8 wind-up lever
9 shutter speed dial
10 film rewind knob
12 film sensitivity dial
16 reflex mirror
18 submirror
20 film
22 cartridge
25 image sensor
27 semiconductor chip
28 rear covers
29 rear covers
30 photographic film plane
31 cartridge receiving structure
32 control circuit
33 image storage temporary memory
34 temporary external memory
34a shutter mechanism
34b shutter mechanism
36 linear magnetic head array
38 magnetic head
40 head interface electronics
41 keyboard
42 display interface electronics
43 input/output device
44 display controller
46 display device
47 power supply
48 microprocessor
50 motor drive
51 internal spool
52 take-up spool
54 arrow
55 image frame
56 arrow
60 detector circuit
62 opto-sensors
64 opto-sensor
65 image frame areas
66 head drive
60 film rail and gate frame structure
72 magnetic tape
78 tracks
82 tape supply side
84 take-up side
86 rails
88 rails
94 head gaps
100 conventional timing generator
102 CCD drivers
104 address generator
106 analog-to-digital converter
108 digital-to-analog converter
110 signal processing circuitry
112 analog signal processing circuitry
114 fixed digital memory
116 data bus

We claim:

1. A camera for recording photographic images on a photographic film contained in a photographic film cartridge and for recording electronic images on a magnetic tape contained in a magnetic tape cartridge, said camera comprising:

a) cartridge receiving means for receiving either one of said photographic film cartridge and said magnetic tape cartridge;

b) optical recording means for recording a photographic image of a subject on the photographic film when the photographic film cartridge is disposed in the cartridge receiving means;

c) electronic image storage means for generating an electronic image of the subject and storing the electronic image as a plurality of electrical signals; and d) recording means, responsive to the magnetic tape cartridge containing the magnetic tape being disposed in the cartridge receiving means, for selectively recording the electronic image stored in the electronic image storage means onto the magnetic tape wherein the magnetic tape does not include a photographic emulsion layer.

2. The camera of claim 1 further including display means for displaying an image of the subject to be photographed.

3. A camera for recording photographic images on a photographic film contained in a photographic film cartridge and for recording electronic images on a magnetic tape contained in a magnetic tape cartridge, said camera comprising:

a) cartridge receiving means for receiving either one of said photographic film cartridge and said magnetic tape cartridge;

b) optical recording means for recording a photographic image of a subject on the photographic film when the photographic film cartridge is disposed in the cartridge receiving means;

c) electronic image storage means, including an image sensor and a memory, for simultaneously storing an electronic image of the subject as the photographic image is being recorded on the photographic film; and d) recording means, responsive to the magnetic tape cartridge containing the magnetic tape being disposed in the cartridge receiving means, for selectively recording the electronic image stored in the electronic image storage means onto the magnetic tape, wherein the magnetic tape does not include a photographic emulsion layer.

4. A camera for recording photographic images on a photographic film contained in a photographic film cartridge and for recording electronic images on a magnetic tape contained in a magnetic tape cartridge, said camera comprising:

a) cartridge receiving means for receiving either one of a photographic film cartridge containing photographic film and a magnetic tape cartridge containing magnetic tape;

b) first optical means including at least one lens for forming an image of a subject on the photographic film when the photographic film cartridge is disposed in the cartridge receiving means;

c) an image sensor, d) second optical means including at least one other lens for forming an image of the subject on the image sensor as the image of the subject is being formed by the first optical means on the photographic film, wherein said image sensor generates an electronic image corresponding to the subject; and d) recording means, responsive to the magnetic tape cartridge containing the magnetic tape being disposed in the cartridge receiving means, for selectively recording the electronic image generated by the image sensor onto the magnetic tape;

wherein the magnetic tape does not include a photographic emulsion layer.

5. The camera of claim 4, wherein the image sensor is an area image sensor and said camera further includes image storage means connected to the area image sensor for storing electronic images generated by the area image sensor; and means for transferring the electronic images stored in the image storage means to the magnetic tape when the magnetic tape cartridge is received by the cartridge receiving means.

6. The camera of claim 5, wherein said recording means includes a magnetic head for causing information representing the electronic images to be stored in a plurality of track locations on the magnetic tape when the magnetic tape cartridge is received in the cartridge receiving means.

7. The camera of claim 6 further including means for transferring images previously stored on the magnetic tape contained in the magnetic tape cartridge disposed in the cartridge receiving means to the image storage means.

8. The camera of claim 7 further including display means and means for selectively transferring the electronic images transferred from the magnetic tape to the image storage means to the display means.

9. A method of operating a camera which can receive a cartridge that has either photographic film or magnetic tape, comprising the steps of:

a) providing a cartridge receiving structure in the camera for receiving either one of a photographic film cartridge containing photographic film and a magnetic tape cartridge containing magnetic tape;

b) recording an image of a subject on the photographic film when a photographic film cartridge is disposed in the cartridge receiving means;

c) receiving an image of the subject and storing such image as a plurality of electrical signals in an image storage means, and d) selectively recording images from the image storage means onto the magnetic tape when the magnetic tape cartridge is received in the cartridge receiving structure, wherein the magnetic does not include a photographic emulsion layer.

10. A camera for recording photographic images on a photographic film contained in a photographic film cartridge and for recording electronic images on a magnetic tape contained in a magnetic tape cartridge, said camera comprising:

a) cartridge receiving means for receiving either one of a photographic film cartridge containing photographic film and a magnetic tape cartridge containing magnetic tape;

b) first optical means including at least one lens for forming an image of a subject on the photographic film when the photographic film cartridge is disposed in the cartridge receiving means;

c) an image sensor;

d) second optical means including at least one other lens for forming an image of the subject on the image sensor as the image of the subject is being formed by the first optical means on the photographic film, wherein said image sensor generates an electronic image corresponding to the subject; and d) recording means, responsive to the magnetic tape cartridge containing the magnetic tape being disposed in the cartridge receiving means, for:

i) selectively recording the electronic image generated by the image sensor onto the magnetic tape; and ii) means for causing only electronic images to be generated by the image sensor when the magnetic tape cartridge is disposed in the cartridge receiving means wherein the magnetic tape does not include a photographic emulsion layer.

11. A camera for recording photographic images on a photographic film contained in a photographic film cartridge and for recording electronic images on a magnetic tape contained in a magnetic tape cartridge, said camera comprising:

a) cartridge receiving means for receiving either one of a photographic film cartridge containing photographic film and a magnetic tape cartridge containing magnetic tape;

b) optical means for recording an image of a subject on the photographic film when a photographic film cartridge is disposed in the cartridge receiving means;

c) image storage means, including an image sensor and a memory for storing an electronic image of the subject;

d) recording means, responsive to a magnetic tape cartridge containing magnetic tape being disposed in the cartridge receiving means, for selectively recording the electronic image stored in the image storage means onto the magnetic tape; and e) means for causing the electronic image to be stored only in the image storage means when there is no cartridge disposed in the cartridge receiving means;

wherein the magnetic tape does not include a photographic emulsion layer.

12. A method of operating a camera which is capable of recording images on a photographic film in a cartridge or for recording images on a magnetic tape in a cartridge, comprising the steps of:

a) inserting a cartridge containing photographic film into cartridge receiving means in the camera;

b) recording an image of a subject on the photographic film and substantially simultaneously recording such image onto an image sensor;

c) storing images recorded by the image sensor; and d) removing the cartridge containing photographic film from the camera and inserting a cartridge containing magnetic tape into the camera and recording selected stored images onto the magnetic tape, wherein the magnetic tape does not include a photographic emulsion layer.

13. A method of operating a camera which is capable of recording images on a photographic film in a cartridge or for recording images on a magnetic tape in a cartridge, comprising the steps of:

a) inserting a cartridge containing photographic film into cartridge receiving means in the camera;

b) recording an image of a subject on the photographic film and substanitally simultaneously recording such image onto an image sensor:

c) storing images recorded by the image sensor;

d) removing the cartridge containing photographic film from the camera and inserting a cartridge containing magnetic tape into the camera and recording selected stored images onto the magnetic tape: and e) transferring the stored images to a memory located external to the camera.

14. A method of operating a still camera as claimed in claim 13 further comprising the steps of:

e) inserting a cartridge containing magnetic tape which has prerecorded digital images into cartridge receiving means in the camera; and f) transferring digital images from the magnetic tape to the memory.

* * * * *